US005654888A

United States Patent [19]

Müller et al.

[11] Patent Number: 5,654,888

[45] Date of Patent: Aug. 5, 1997

[54] CONTROL ARRANGEMENT FOR VEHICLES

[75] Inventors: Margit Müller; Martin Knoss, both of Asperg; Thomas Zeller, Ditzingen, all of Germany

[73] Assignee: Robert Bosch GmbH, Stuttgart, Germany

[21] Appl. No.: 561,822

[22] Filed: Nov. 22, 1995

Related U.S. Application Data

[63] Continuation of Ser. No. 196,153, filed as PCT/DE93/00499, Jun. 9, 1993, abandoned.

[30] Foreign Application Priority Data

Jun. 20, 1992 [DE] Germany .......................... 42 20 247.7

[51] Int. Cl.[6] .......... B62D 63/02

[52] U.S. Cl. .......... 364/424.083

[58] Field of Search .......... 364/424.03, 431.03, 364/431.04, 431.05, 424.083, 424.034, 426.021, 424.091, 424.038; 123/479, 478, 480

[56] References Cited

U.S. PATENT DOCUMENTS

| | | | |
|---|---|---|---|
| 4,305,359 | 12/1981 | Mann et al. | 123/333 |
| 4,603,675 | 8/1986 | Junginger et al. | 123/478 |
| 4,805,576 | 2/1989 | Abe et al. | 123/479 |
| 4,850,325 | 7/1989 | Abe et al. | 123/479 |
| 4,881,227 | 11/1989 | Bühren | 371/9 |
| 4,919,097 | 4/1990 | Mitui et al. | 123/399 |
| 4,989,569 | 2/1991 | Eidler | 123/479 |
| 5,070,960 | 12/1991 | Nobumoto et al. | 180/197 |
| 5,163,530 | 11/1992 | Nakamura et al. | 180/197 |
| 5,170,769 | 12/1992 | Berger et al. | 123/688 |
| 5,200,897 | 4/1993 | Makino et al. | 364/426.02 |
| 5,216,916 | 6/1993 | Bederna et al. | 73/118.1 |
| 5,239,469 | 8/1993 | Walker et al. | 364/424.03 |
| 5,240,094 | 8/1993 | Suzuki | 192/4 A |
| 5,255,193 | 10/1993 | Katayose et al. | 364/426.02 |
| 5,258,912 | 11/1993 | Ghoneim et al. | 364/424.05 |
| 5,280,432 | 1/1994 | Kuwana et al. | 364/426.02 |
| 5,281,008 | 1/1994 | Kawamura et al. | 303/100 |
| 5,292,184 | 3/1994 | Takata | 303/100 |

FOREIGN PATENT DOCUMENTS

| | | |
|---|---|---|
| 0536557 | 4/1993 | European Pat. Off. . |
| 3539407 | 5/1987 | Germany . |

*Primary Examiner*—Kevin J. Teska
*Assistant Examiner*—Stephen J. Walder, Jr.
*Attorney, Agent, or Firm*—Walter Ottesen

[57] ABSTRACT

A control arrangement for vehicles is suggested which includes at least two computer elements for carrying out at least the same control function. Measures for checking the operability of the control arrangement are provided. The execution of these measures is allocated to the at least two computer elements in such a manner that each computer element carries out at least one of the monitoring measures. This monitoring measure is not carried out by the other computing element.

8 Claims, 3 Drawing Sheets

First Computer Element
Second Computer Element
Control Apparatus
Measuring Device
Position Transducer
Power Actuating Element
Output Stage

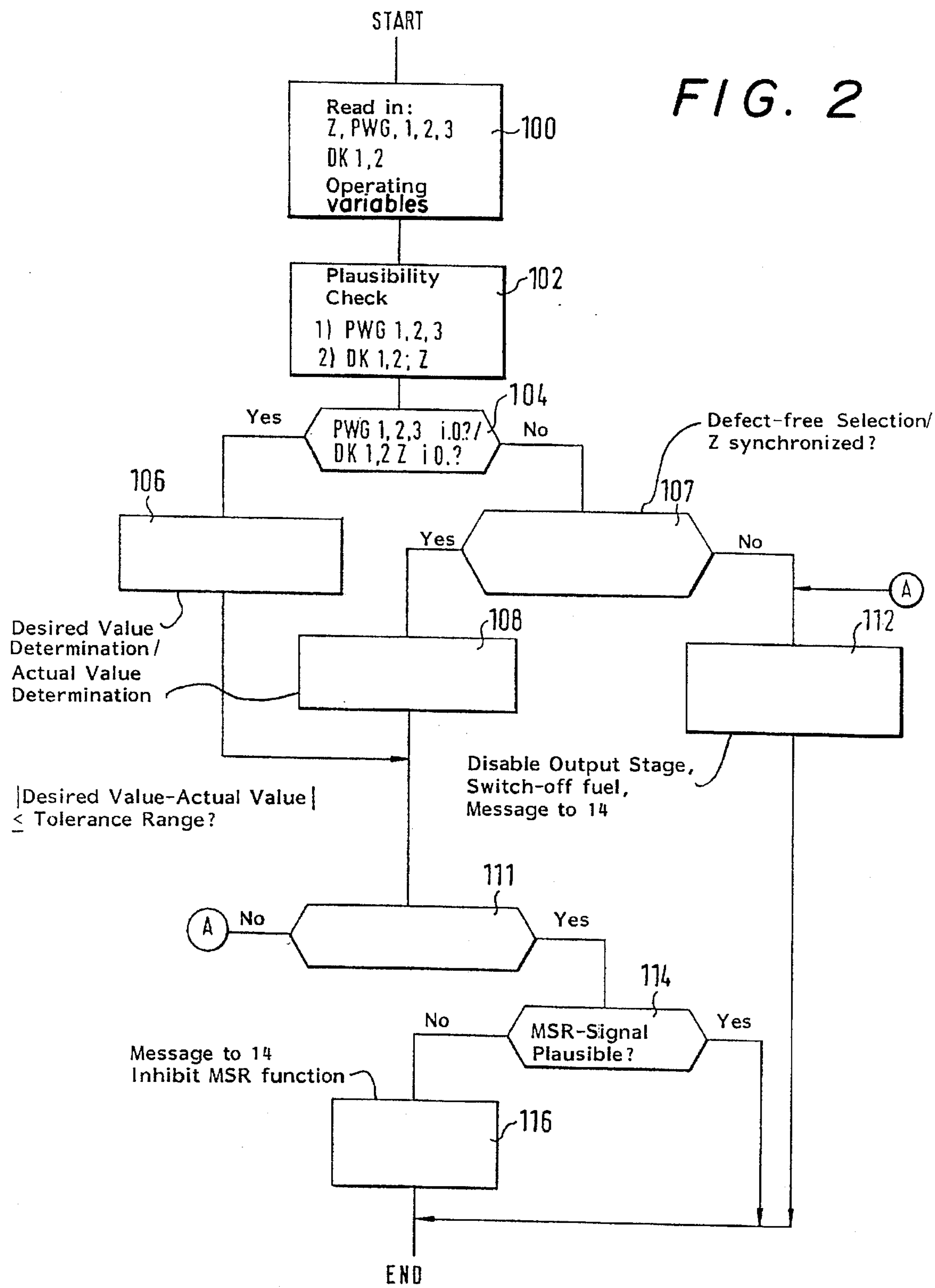
FIG. 2
START
Read in:
Z, PWG, 1, 2, 3
DK 1,2
Operating variables
100
Plausibility Check
1) PWG 1, 2, 3
2) DK 1,2; Z
102
104
PWG 1, 2, 3 i.0?/
DK 1,2 Z i 0.?
Yes
No
Defect-free Selection/
Z synchronized?
107
Yes
No
106
Desired Value Determination/
Actual Value Determination
108
A
112
Disable Output Stage,
Switch-off fuel,
Message to 14
|Desired Value-Actual Value|
≤ Tolerance Range?
111
A
No
Yes
114
MSR-Signal Plausible?
No
Yes
Message to 14
Inhibit MSR function
116
END

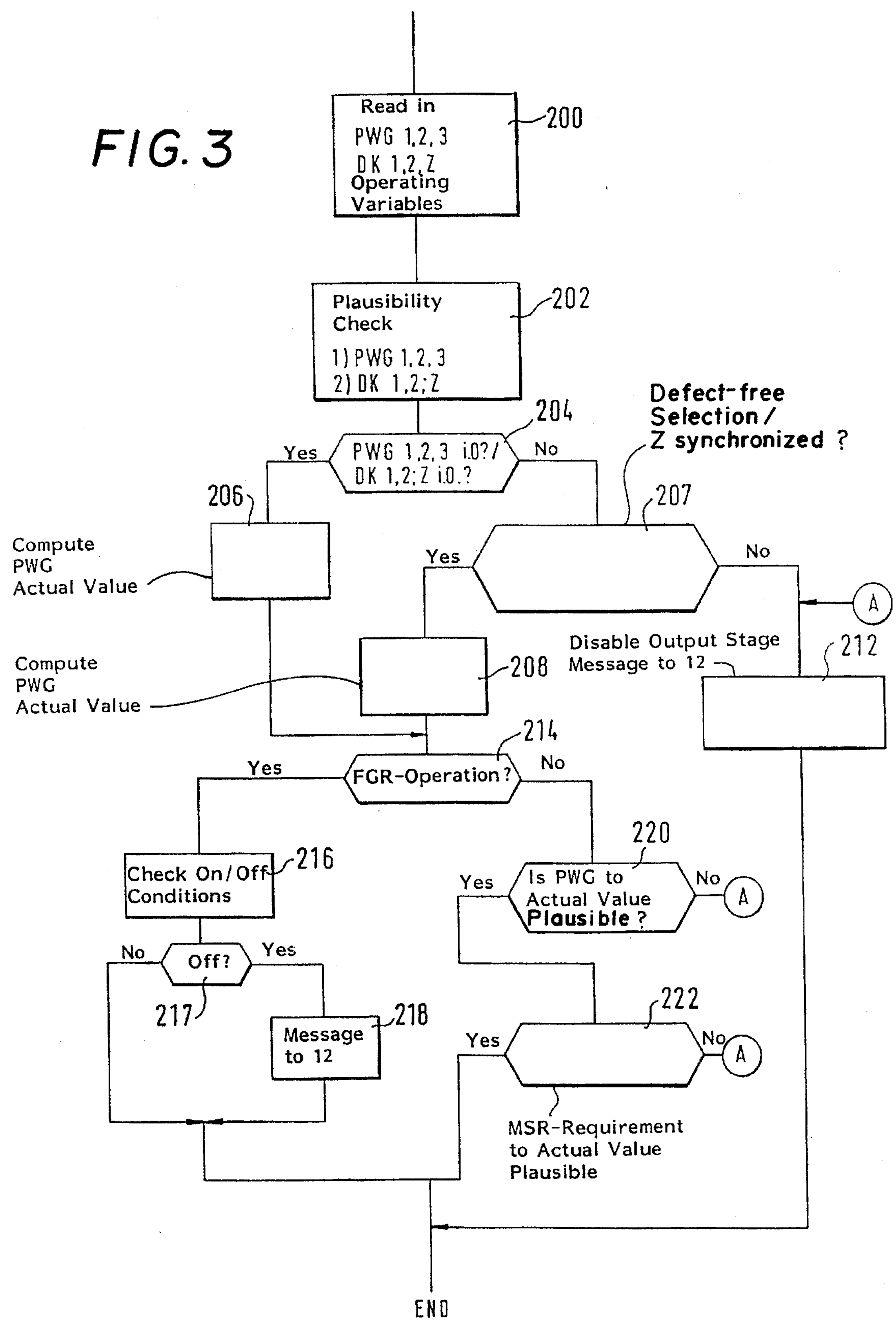
FIG. 3
Read in
PWG 1,2,3
DK 1,2,Z
Operating Variables
200
Plausibility Check
1) PWG 1,2,3
2) DK 1,2;Z
202
204
Yes
PWG 1,2,3 i.0?/
DK 1,2;Z i.0.?
No
Defect-free Selection / Z synchronized ?
206
207
Compute PWG Actual Value
Yes
No
A
Disable Output Stage Message to 12
212
Compute PWG Actual Value
208
214
Yes
FGR-Operation?
No
220
Check On/Off Conditions
216
Yes
Is PWG to Actual Value Plausible ?
No
A
No
Off?
Yes
217
218
Message to 12
222
Yes
No
A
MSR-Requirement to Actual Value Plausible
END

CONTROL ARRANGEMENT FOR VEHICLES

This is a continuation of application Ser. No. 08/196,153, filed on Feb. 22, 1994, the specification of which was filed as PCT International Application no. PCT/DE 93/00499, on Jun. 9, 1993, now abandoned.

FIELD OF THE INVENTION

The invention relates to a control arrangement for vehicles having two computer elements.

BACKGROUND OF THE INVENTION

Control arrangements for vehicles are increasingly equipped with two computer elements especially for reasons of operational reliability and availability. This applies especially to the preferred area of application of the invention described below in combination with an electronic motor power control for motor vehicles. Examples of control arrangements of this kind are provided in U.S. Pat. No. 4,881,227 or the DE-A 35 39 407.

U.S. Pat. No. 4,881,227 describes a computer system with two processors in a motor vehicle wherein the two processors operate fully independently of each other and mutually monitor each other on the basis of different monitoring criteria, for example, based on a pregiven data exchange protocol and, in the case of a fault, the two processors can start each other. Suggestions with respect to a reliability concept for the application of such a computer system to an electronic motor power control are not described.

The DE-A 35 39 407 likewise describes a computer system having two processors for a motor vehicle. The suggestion is made that for normal operation work is allocated to the computers for improving the reliability and the speed of operation. This allocation of work provides that in a first processor, the determination of the desired value is made for a control; whereas, in the other second processor, the computation of the actuating variable takes place in dependence upon the difference between the desired value and the actual value. In this way, the computer speed as well as the speed of the control is increased by means of the distribution of the computer load. As a safety concept, it is further provided that all monitoring tasks which serve the operational reliability as well as the availability of the system are carried out by both processors parallel to each other in a redundant manner. Both computing elements have a scope of function at a high level with reference to the monitoring measures with a corresponding high complexity.

SUMMARY OF THE INVENTION

Accordingly, it is the object of the invention to provide a reliability concept for a control arrangement for motor vehicles having at least two computer elements which serve to carry out the same control function so that the functional scope of the individual computer elements can be reduced without the operational reliability and the availability of the entire system. The control arrangement of the invention is for vehicles and includes: two computer elements adapted to carry out the same control function which includes at least two different measures for checking operability; a plurality of measuring devices for detecting respective operating variables; and, the measures being allocated to the two computer elements in such a manner that each computer element carries out at least one of the monitoring measures exclusively and independently of the other computer element.

This is achieved by the characterizing features of claim 1. The monitoring measures required for assuring the operational reliability and availability are at least partially allocated to the computer elements and are carried out by each computing element exclusively and independently.

The preferred application of the control arrangement described is in the area of motor control for motor vehicles. Such a motor control includes for spark-ignition engines an electronic engine power control in addition to ignition control and fuel injection; that is, an electronic control for positioning the throttle flap which is dependent essentially on the driver command (position of a driver-controllable element). Similar control arrangements are known in combination with diesel engines. There, in the context of open-loop or closed-loop control of the metering of fuel, an influencing of the power-actuating element of the injection pump is provided in dependence on the actuation of the operator-controlled element. Systems of this kind effect increased power so that higher requirements are to be imposed with respect to the monitoring measures for the controlling electronic devices.

In the past, different strategies were therefore developed which serve for monitoring these electronic devices and, for example, are known from U.S. Pat. Nos. 4,603,675; 5,170,769; and, 4,305,359; as well as U.S. patent application Ser. No. 08/144,010 filed on Nov. 1, 1993. It is known from U.S. Pat. No. 4,603,675 to monitor the difference between desired and actual values for the position of the throttle flap for the purpose as to whether, after a pregiven time, desired and actual values are disposed with respect to each other in a pregiven tolerance range. Furthermore, it is provided to connect two position transducers to the operator-controllable element. A fault in the area of the position transducer is determined when the signal difference between the two position transducers exceeds a pregiven maximum value.

From U.S. Pat. No. 4,305,359, it is known to derive a fault function of the control arrangement based on a comparison of the position of the operator-controllable element and the position of the power-actuating element in that a fault condition is then assumed when the position of the operator-controlled element and the position of the power-actuating element do not correspond in the context of the pregiven tolerances.

Finally, the suggestion is made in U.S. patent application Ser. No. 08/144,010 filed on Nov. 1, 1993 to provide three position transducers in combination with the operator-controllable element and/or the power-actuating element so that three position data are available for evaluation with respect to fault functions in the area of these position transducers. The defective position transducer is isolated by a so-called two-out-of-three selection and the function of the control arrangement is maintained in its entirety on the basis of the two position transducers which have been determined to be operable without limitation of the availability.

The procedure according to the invention permits the realization of a control unit having several computer elements wherein the functional scope of the individual computer elements is reduced without the operational reliability and availability of the control unit being affected.

Special significance is imparted to the procedure according to the invention in that a flexible, programmable reliability concept is shown by allocating the monitoring measures. Each computer element can be set up independently of the other computer element(s) with reference to the monitoring measures assigned to it and with respect to the reaction to the results thereof.

It is especially advantageous to allocate more complex monitoring measures (for a finer monitoring) to a first computing element; whereas, monitoring measures of a simpler type (for a coarser monitoring) are carried out by a second computing element independently of the first computing element.

In this connection, it is advantageous that the second computing element has a very reduced operational scope and therefore is made ready with slight effort.

In this context, it is advantageous to assign a monitoring function with respect to desired and actual values of the control loop to the first computing element and to assign a coarser monitoring with respect to accelerator pedal position and actuating element position to the other computing element. In this way, the control system, especially the position of the actuating element, is monitored on redundant paths by two monitoring functions which can be carried out in two computer elements independently of each other.

A further advantage of the procedure according to the invention is that no rigid coupling is required between the two computer elements so that both computer elements can assume further functions (such as fuel injection, ignition).

It is further advantageous to carry out monitoring measures with respect to functions which intervene externally such as road-speed controllers, MSR intervention, et cetera in the second computer element for an electronic motor power control system.

A further improvement of the operational reliability is achieved by monitoring the two computing elements by cyclically exchanging data.

The use of redundant (triple) sensors is advantageous because of the independence of the two computing elements. The measuring signals of the sensors are respectively evaluated entirely or partially in the computing elements for checking function.

BRIEF DESCRIPTION OF THE DRAWINGS

The invention will now be described with reference to the drawings wherein:

In FIGS. 2 and 3, the monitoring measures with respect to a preferred embodiment are sketched. The monitoring measures are executed in respective ones of the two computer elements.

DESCRIPTION OF THE PREFERRED EMBODIMENTS OF THE INVENTION

Figure 1:
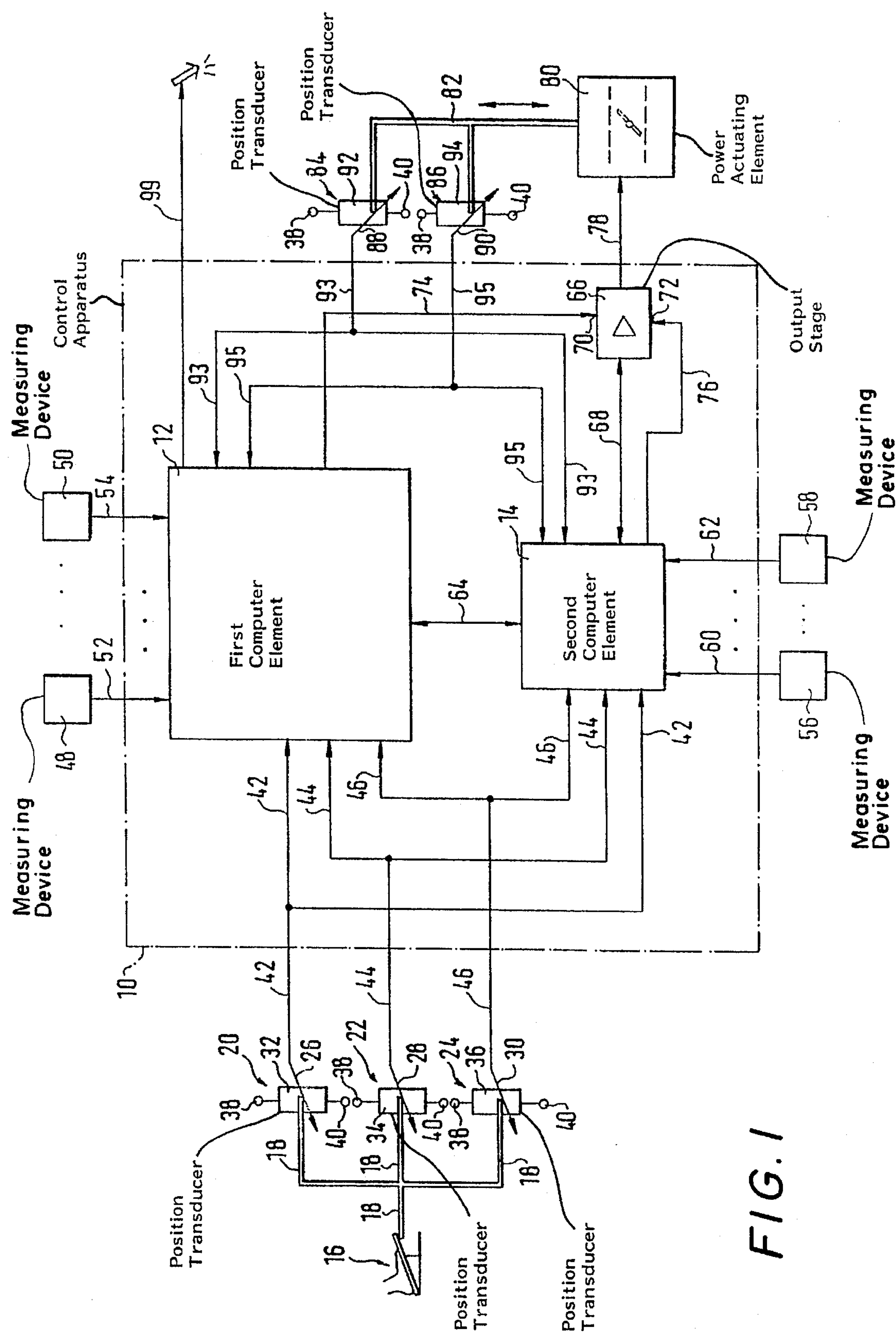
FIG. 1 is an overview block circuit diagram of a control arrangement for an electronic motor power control.

In FIG. 1, a control unit 10 is shown for a drive unit of a motor vehicle and includes at least two computer elements 12 and 14. Furthermore, an operator-actuated element 16 is shown which is connected via a mechanical connection 18 to three position transducers 20, 22 and 24. In FIG. 1, these position transducers are shown as potentiometers in accordance with a preferred embodiment. The operator-controlled element 16 acts via the connection 18 on the movable wiper taps 26, 28 and 30 of the position transducers 20, 22 and 24. These wiper taps slide over the resistance tracks 32, 34 and 36, respectively, in accordance with the movement of the operator-controlled element 16. The resistance tracks 32, 34 and 36 are each connected to a positive pole 38 and to a negative pole 40 of a supply voltage. The lines 42 (position transducer 20), 44 (position transducer 22) and 46 (position transducer 24) are connected to the slider taps. These lines 42, 44 and 46 are connected to the first computer element 12 as well as to the second computer element 14. In addition, measuring devices 48 to 50 are provided for operating variables of the drive unit and/or of the motor vehicle. The measuring devices 48 to 50 are connected via lines 52 to 54 to the first computer element 12. Furthermore, additional measuring devices 56 to 58 are provided for operating variables of the drive unit and/or of the motor vehicle and are connected via lines 60 to 62 to the second computer element 14. A line system 64 is provided between the two computer elements 12 and 14 for serial data exchange between the two computer elements.

Furthermore, the control apparatus 10 shown in FIG. 1 includes an output stage 66 which is connected via the drive line 68 to the second computer element 14. The output stage 66 includes activating and deactivating inputs 70 and 72, respectively. The input 70 is connected via line 74 to the first computer element and the input 72 is connected via the line 76 to the second computer element 14. The output line 78 of the output stage is the output line of the control apparatus 10. The output line 78 is connected to a power-actuating element 80 of a drive unit (not shown) such as an internal combustion engine. The power-actuating element 80 is a throttle flap driven by a step motor in a preferred embodiment.

The power-actuating element 80 is connected via a mechanical connection 82 to two position transducers 84 and 86 which, in a preferred embodiment, are defined by potentiometer arrangements in accordance with the position transducers 20, 22 and 24. For this reason, the position transducers 84 and 86 include in a similar manner slider taps 88, 90 and resistance tracks 92, 94 which are connected to the positive and negative poles of the supply line. Signal lines 93 and 95 are connected to the slider taps 88 and 90, respectively, which are connected to the first computer element as well as to the second computer element.

Further functions such as fuel metering can be carried out by the computer element 12 as indicated by line 99.

The function of the control apparatus shown in FIG. 1 is described below in the context of a preferred embodiment.

The three position values for the operator-controlled element 16 are detected by the position transducers 20, 22 and 24. These position values are supplied to the two computer elements 12 and 14. A plausibility check of the three signal values with respect to each other is carried out in both computer elements and, for the case that a defective signal value is detected, this signal value is excluded from further evaluation. If all three signal values are unplausible to each other, then the detecting computer element switches off the output stage 66 via the line 74 and transmits corresponding data to the other computer element via the line 64.

The following measures are executed inter alia in the computer element 12.

The computer element 12 forms a position desired value for the power-actuating element 80 from the supplied position signal values, which are plausible to each other, while considering, if necessary, further operating variables detected by the measuring devices 48 to 50.

The additional operating variables mentioned above are especially transmission parameters, intervention signals of a drive slip control (ASR) or a motor drag torque control (MSR) as well as (for the area of idle control) road speed, engine speed, engine temperature, et cetera. In addition, the function of a road-speed control can be provided in the computer element 12 so that, via the lines 52 to 54, also the position of an operator-actuated lever, a signal with respect to the brake actuation as well as additional signal values necessary for road-speed control can be supplied.

The desired value for the position of the power-actuating element is converted in computer element 14 into a pregiven number of steps for controlling a step motor for the actuating element 80. A so-called step counter runs which has a count position representing the number of steps to be carried out and therefore defines an index for the position of the step motor or of the actuating element 80.

Signal values for the position of the actuating element 80 are supplied via the input lines 93 and 95 to the computer elements 12 and 14. In the two computer elements, the position data of the two position transducers as well as of the step count position are checked with respect to each other as to plausibility and, in the manner of the case of the position signals for the operator-actuated element 16, defective position data is precluded or, for plausibility of the two signal values of the position transducers 84 and 86 to each other with an unplausible step count, a conclusion is drawn as to step loss and the position count is correspondingly adjusted. An actual value for the throttle flap is computed from the supplied signal values for the position of the actuator element 80. This actual value is compared to the computed desired value and results in an index for the operability of the system. Here, a check is made as to whether a residual deviation remains between the desired and actual values of the position of the actuating element 80. If this is the case, the output stage arrangement 66 is switched off by the computer element 12 and the fault condition is transmitted via the series interface 64 to the second computer element 14.

Furthermore, monitoring measures with respect to individual signals are carried out in the computer element 12 (monitoring of signal value range).

A MSR intervention signal indicates a position increasing drive of the actuating element. This MSR intervention signal is, on the one hand, transmitted from the computer element 12 to the computer element 14 and, on the other hand, is checked as to a plausible signal range. If a signal of this kind is not plausible, that is, if the signal value is located outside of the pregiven signal value range, then this signal value is transmitted to the computer element 14 and the MSR function is switched off.

The computed desired value is further outputted via interface 64 to the computer element 14 which adjusts the step motor via the current control in accordance with the input.

In addition, the following measures are carried out in the computer element 14.

The position signals of the sensors or position transducers 20, 22, 24, 84 and 86 are supplied to this computer element. The above-described plausibility checks with respect to the position signals of operator-actuated element 16 and actuating element 80 are therefore likewise undertaken in computer element 14 with the aid of a step counter. Furthermore, the provision is made that an additional coarser monitoring takes place in the computer element 14. The position value (computed actual value or individual signal values of the transducers 84 and/or 86) of the actuating element 80 is set into relationship with the position value (individual signal values of the transducers 20, 22, 24 or a value computed from this value or an individual one of the values) of the operator-actuated element 16 and checked as to a pregiven tolerance range. If the position actual value lies above a tolerance range fixed by the position of the accelerator pedal, then a fault function of the system is detected, the output stage arrangement is switched off via the line 76 and this is transmitted to the computer element 12 via line 64. These monitoring measures are redundant to the monitoring of the control loop which is carried out in element 12. In this way, the monitoring of the function of the control loop is carried out via two monitoring measures which are carried out independently of each other in two computer elements. In this way, the operating reliability and availability is improved while reducing the functional scope of the computer elements since two redundant monitoring measures in each computer element can be omitted.

The plausibility check of the MSR intervention is undertaken in the computer element 14. Here, the throttle flap angle adjusted by the MSR function is checked based on the actual value of the position element and the position value of the operator-actuating element as to a plausible range pregiven for MSR intervention. If the position of the actuating element is above this plausible range, then the output stage arrangement is switched off and the fault condition is transmitted to the computer element 12.

Measures can be taken in computer element 14 which determine the switch-on or switch-off conditions of the road-speed controller (switch-off for the following: actuating brakes, when there is a drop below a minimum speed limit, when the "out"-switch is actuated, et cetera).

The computer element 12, in a preferred embodiment, can furthermore include tasks with respect to the fuel injection, ignition adjustment or transmission control. In another advantageous embodiment, the provision can be made that the drive of the step motor is undertaken not by the computer element 14 but instead by computer element 12.

In addition, the described allocation can be advantageous also in combination with diesel engines.

In other embodiments, it is advantageous to use contactless position transducers in lieu of the potentiometers as position transducers. It can also be advantageous to provide a combination of potentiometers and contactless position transducers. Furthermore, one of the three position transducers can also be configured as a switch element.

The same considerations apply in connection with the position transducers for the actuating element 80.

FIG. 2 shows the monitoring measures carried out by the computing element 12 in the form of a flowchart.

In a first step 100, the following is done: the counter position Z of the step counter is determined, the position values of the three position transducers 20, 22 and 24 (PWG1, 2, 3) as well as of the position transducers 84 and 86 (DK1, 2) as well as, if required, further operating variables are read in.

Thereafter, in a step 102, and according to measures known in the state of the art, a plausibility check is made of the three position signal values of the operator-controlled element 16 to each other as well as of the two position signal values of the actuating element 80 and of the step count position.

In the next inquiry step 104, a check is made as to whether the plausibility check with respect to the position of the operator-controlled element and/or the position of the actuating element has led to a fault-free result. If this is the case, then, in the next step 106, the signal values of the position of the operator-controlled element or the signal values of the actuating element position are determined. The signal values of the position of the operator-controlled element serve as the basis for the computation of a position desired value and the signal values of the actuating element position serve as the basis of a computation of the actual value. In an advantageous embodiment, these values can be computed in this step (for example, mean value formation, a signal value is preferred et cetera) or they can be determined in a separate program step.

If it was determined in step 104 that the plausibility checks in accordance with step 102 resulted in a fault condition, then a check is made in inquiry step 107 as to whether via the plausibility check according to step 102 with respect to operator-controlled element position and/or actuating-element position, signal variables were selected which are plausible to each other. For an unplausible step count condition, the counter is set to the values determined by the position transducers.

If this is the case, then the method proceeds with step 108 on the basis of the signal values plausible to each other in accordance with step 106.

If all signals of the operator-controlled position or the actuating-element position are unplausible to each other, then the output stage arrangement is switched off in accordance with step 112, an emergency arrangement (switch-off of the fuel metering above a pregiven rpm) is activated and the corresponding message is transmitted to the computer element 14.

The described measures are carried out parallel with respect to the position signals of the operator-controlled element as well as with respect to the position signals of the actuating element.

Step 111 follows the steps 106 or 108. In step 111, the determined desired value is compared to the actual value of the actuator-element position for monitoring the control loop. If the two values deviate from each other outside of a pregiven tolerance, then the program is continued with step 112. If the two values are within the frame of the tolerance, then the plausibility of the MSR intervention signals (a desired value operating in the direction "open" of the actuating element) is checked in the context of a signal value range check. If a fault is detected in step 114, then this is transmitted in step 116 to the computer element 14 and the MSR function is inhibited. Thereafter, the subprogram is ended as is also the case for fault-free MSR intervention signals.

The flowchart shown in FIG. 2 describes only the monitoring measures undertaken in computer element 12. Further tasks are carried out in computer element 12 such as additional known monitoring measures with respect to other signals and measures such as computing the ignition time point, injection quantity or a road-speed control.

In a comparable manner, FIG. 3 shows a flowchart of monitoring measures undertaken in computer element 14. Here too, it is noted that in computer element 14 also additional tasks are carried out which, for example, serve to drive the step motor.

Here too, in the first step 200, the signal values of the position transducers of the operator-actuated element as well as of the actuating element are read in, the step motor count is determined, the desired value computed by the computer element 12 is read in via line 46 and the additional operating variables are likewise read in which, if necessary, are transmitted via input lines 60 to 62.

In a manner similar to the flowchart of FIG. 2, the signal values of the position transducers of the operator-controlled element and of the actuating element are checked with respect to each other as to plausibility in the steps 202, 204, 207 and 212. In the fault-free case, position values are determined in accordance with step 206 or the signal values serving for determination are determined. The position values represent the operator-controlled element position and the actuator-element position. In the case of a fault, a reaction corresponding to step 207 (107) occurs and in the case of a defect, (step 207 "no"), a reaction in correspondence to steps 208 or 212 (message to 12, switch-off of the output stage) occurs (according to step 108 or 112).

If the plausibility check in step 202 led to at least two signal values which are plausible to each other, an actuating-element position as well as an operator-controlled element position could be formed, then an inquiry is made in step 214 as to whether the road-speed controller is active. In this case, the operational conditions for the road-speed control are checked in steps 216 and 217 (brake actuation, on/off switch, operator-controlled element operating correctly) and, if necessary, the speed control is inhibited in that the computer element 12 is supplied with a corresponding message (step 218). Thereafter, the subprogram for the active road-speed control is ended.

If the system is not in the road-speed control operation, then according to step 220, a monitoring of the position of the actuating element 80 with respect to the position of the operator-controlled element 16 is carried out. Here, a check is made as to whether the two positions are plausible to each other in the context of a tolerance or, in an especially simple form, as to whether the actuator-element position is significantly greater than pregiven by the operator-controlled element. If this is the case, then according to step 212, the output stage is switched off and a message is sent to the computer element 12 which, if necessary, switches off the metering of fuel. In a fault-free case, a check of the MSR function is carried out in step 222. The position of the actuator element is compared to the position required by the MSR intervention signal and a fault is then detected when the position of the actuating element 80 is significantly greater than the position value pregiven by the MSR intervention signal. Step 212 follows in the case of a fault and the subprogram is ended in a fault-free case.

Furthermore, the drive of the step motor is carried out in dependence upon the desired value determined in computer element 12.

In a preferred embodiment, the computer element 12 carries out further functions such as drive tasks for injection valves, computation tasks (sensor signal evaluation), limit tasks (speed limiting), et cetera.

In addition to the allocation of monitoring measures, in other advantageous embodiments, further allocations can be undertaken. What is important here is that the allocation is undertaken in such a manner that a monitoring carried out in the first computer element is repeated on a redundant path in the second computer element.

For example, the described plausibility check of the position-transducer signals can take place in the second computer element in a simpler manner (comparison of only two values).

We claim:

1. A control arrangement for a vehicle having a motor equipped with a power actuating element for adjusting the output power of the motor, the arrangement comprising:

first computer means for controlling the power of the motor;

second computer means for monitoring the operation of said first computer means;

first input means for supplying a first input signal to said first and second computer means indicative of a command of the operator of the vehicle;

said first computer means including means for determining a desired value for the electronic control on the basis of said first input signal;

second input means for supplying a second input signal to said first and second computer means indicative of an actual value of the electronic power control;

said first input means, said second input means, said first and second computer means conjointly defining the electronic power control for supplying an output signal for operating on said power actuating element to control the power of the motor;

said first computer means including means for comparing said desired value to said actual value to monitor the operation of said electronic power control;

said second computer means including means for comparing said first input signal and said second input signal to each other for monitoring the operation of said electronic power control; and, the comparison in each of said computer means being conducted entirely independently of the comparison in the other one of said computer means.

2. The control arrangement of claim 1, wherein said motor includes a throttle flap; and, said power actuating element includes a step motor for adjusting said throttle flap, and wherein the control arrangement is used in the context of an electronic engine-power control; said first computer means is adapted to carry out a controller computation based on a difference of said input signal and said second input signal indicative of an actual position of said throttle flap; and, said second computer means is adapted to carry out the measures for driving said step motor.

3. The control arrangement of claim 1, further comprising additional input means for inputting additional input signals to said first computer means for consideration when determining said desired value; and, said additional signals being indicative of additional operating variables.

4. The control arrangement of claim 1, wherein said motor includes a throttle flap actuated by said power actuating element; and, an MSR intervention adjusts said throttle flap via said power actuating element thereby causing said throttle flap to assume a new angle; and, wherein said second computer means is adapted to carry out a plausibility check of the MSR intervention based on a comparison between a pregiven position of said power actuating element and the actual position of the actuating element corresponding to said new angle of said throttle flap; and, said first computer means is adapted to carry out a check of the MSR signal in the context of a signal value range check.

5. The control arrangement of claim 1, wherein said first and second computer means are adapted to monitor each other in that they exchange data via a series interface.

6. The control arrangement of claim 1, wherein, in the case of a fault, said first computer means intervenes in the metering of fuel.

7. A control arrangement for a vehicle having a motor equipped with a power actuating element for adjusting the output power of the motor, the arrangement comprising:

first computer means for controlling the power of the motor;

second computer means for monitoring the operation of said first computer means;

first input means for supplying a first input signal to said first and second computer means indicative of a command of the operator of the vehicle;

said first computer means including means for determining a desired value for the electronic control on the basis of said first input signal;

second input means for supplying a second input signal to said first and second computer means indicative of an actual value of the electronic power control;

said first input means, said second input means, said first and second computer means conjointly defining the electronic power control for supplying an output signal for operating on said power actuating element to control the power of the motor;

said first computer means including means for comparing said desired value to said actual value to monitor the operation of said electronic power control;

said second computer means including means for comparing said first input signal and said second input signal to each other for monitoring the operation of said electronic power control; and, the comparison in each of said computer means being conducted entirely independently of the comparison in the other one of said computer means;

said first input means supplying three mutually independent first input signals to said first and second computer means;

said second input means supplying three mutually independent second input signals to said first and second computer means;

each of said computer means including means for comparing each two of said first input signals to each other to obtain a first set of deviations between respective pairs of first input signals; and, means for comparing each two of said second input signals to each other to obtain a second set of deviations between respective pairs of said second input signals; and, each of said computer means further including means for selecting from said sets of deviations one of said first input signals and one of said second input signals which are plausible to each other.

8. A control arrangement for a vehicle having a motor equipped with a power actuating element for adjusting the output power of the motor, the arrangement comprising:

first computer means for controlling the power of the motor;

second computer means for monitoring the operation of said first computer means;

first input means for supplying a first input signal to said first and second computer means representing an external intervention signal (MSR);

said first computer means including means for determining a desired value for the electronic power control on the basis of said first input signal;

second input means for supplying a second input signal to said first and second computer means indicative of an actual value of the electronic power control;

said first input means, said second input means, said first and second computer means conjointly defining the electronic power control for supplying an output signal for operating on said power actuating element to control the power of the motor;

said first computer means is adapted to carry out a check of said first input signal in the context of a signal value range check;

said second computer means is adapted to carry out a plausibility check based on a comparison between the desired value and the actual value; and, the comparison in each of said computer means being conducted entirely independently of the comparison in the other one of said computer means.

* * * * *